(12) United States Patent  (10) Patent No.: US 7,688,345 B2
Kenoyer et al. (45) Date of Patent: Mar. 30, 2010

(54) AUDIO OUTPUT IN VIDEO CONFERENCING AND SPEAKERPHONE BASED ON CALL TYPE

(75) Inventors: Michael L. Kenoyer, Austin, TX (US); Wayne E. Mock, Round Rock, TX (US)

(73) Assignee: LifeSize Communications, Inc., Austin, TX (US)

(*) Notice: Subject to any disclaimer, the term of this patent is extended or adjusted under 35 U.S.C. 154(b) by 1179 days.

(21) Appl. No.: 11/252,359

(22) Filed: Oct. 17, 2005

(65) Prior Publication Data

US 2006/0238611 A1 Oct. 26, 2006

Related U.S. Application Data

(60) Provisional application No. 60/619,212, filed on Oct. 15, 2004, provisional application No. 60/676,057, filed on Apr. 29, 2005.

(51) Int. Cl.
*H04N 7/14* (2006.01)
*H04M 3/42* (2006.01)

(52) U.S. Cl. ............... 348/14.1; 348/14.08; 348/14.01

(58) Field of Classification Search ... 348/14.01–14.16; 379/202.01; 370/260–261
See application file for complete search history.

(56) References Cited

U.S. PATENT DOCUMENTS

| | | | |
|---|---|---|---|
| 5,034,947 A | 7/1991 | Epps | |
| 5,054,021 A | 10/1991 | Epps | |
| 5,617,539 A | 4/1997 | Ludwig et al. | |
| 5,657,096 A | 8/1997 | Lukacs | |
| 5,689,641 A | 11/1997 | Ludwig et al. | |
| 5,737,011 A | 4/1998 | Lukacs | |
| 5,737,431 A | 4/1998 | Brandstein et al. | |
| 5,751,338 A | 5/1998 | Ludwig, Jr. | |
| 5,764,277 A | 6/1998 | Loui et al. | |
| 5,896,128 A | 4/1999 | Boyer | |
| 6,020,915 A * | 2/2000 | Bruno et al. | 348/14.09 |
| 6,292,210 B1 * | 9/2001 | Gerszberg et al. | 348/14.01 |
| 6,587,823 B1 | 7/2003 | Kang et al. | |
| 6,590,604 B1 | 7/2003 | Tucker et al. | |
| 6,593,956 B1 | 7/2003 | Potts et al. | |
| 6,594,688 B2 | 7/2003 | Ludwig et al. | |
| 6,816,904 B1 | 11/2004 | Ludwig et al. | |
| 6,822,507 B2 | 11/2004 | Buchele | |
| 6,912,178 B2 | 6/2005 | Chu et al. | |
| 6,980,485 B2 | 12/2005 | McCaskill | |
| 7,012,630 B2 | 3/2006 | Curry et al. | |

(Continued)

OTHER PUBLICATIONS

Pellicci et al.; Speakerphone is also module for Video Conference system; Sep. 14, 2000; WO 00/54502.*

(Continued)

*Primary Examiner*—Melur Ramakrishnaiah
(74) *Attorney, Agent, or Firm*—Meyertons Hood Kivlin Kowert & Goetzel, P.C.

(57) ABSTRACT

A conference call may involve participants with video conferencing systems and participants with speakerphone systems. In some embodiments, sound from speakerphone participants may be sent through a speakerphone sound system while sound from video participants may be sent through the video sound system (e.g., near a video monitor). Sound may be localized through a combination of both the video sound system and the speakerphone sound system to produce a spatially correct sound field for in room participants.

20 Claims, 6 Drawing Sheets

U.S. PATENT DOCUMENTS

| | | | |
|---|---|---|---|
| 7,130,428 | B2 | 10/2006 | Hirai et al. |
| 7,339,605 | B2 | 3/2008 | Rodman et al. |
| 2003/0149724 | A1* | 8/2003 | Chang .................. 709/204 |
| 2005/0212908 | A1 | 9/2005 | Rodman et al. |
| 2005/0262201 | A1 | 11/2005 | Rudolph et al. |
| 2006/0013416 | A1 | 1/2006 | Truong et al. |
| 2006/0034469 | A1 | 2/2006 | Tamiya et al. |
| 2006/0104458 | A1 | 5/2006 | Kenoyer et al. |
| 2006/0165242 | A1 | 7/2006 | Miki et al. |

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

"The Wainhouse Research Bulletin"; Apr. 12, 2006; 6 pages; vol. 7, #14.

"VCON Videoconferencing"; http://web.archive.org/web/20041012125813/http://www.itc.virginia.edu/netsys/videoconf/midlevel.html; 2004; 6 pages.

Peter Klein; "Video Workplace Conference"; IEEE Proceedings of Globecom; 1985; pp. 109-112; Siemens AG, Germany.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

C. M. Tan, P. Fletcher, M. A. Beach, A. R. Nix, M. Landmann and R. S. Thoma; "On the Application of Circular Arrays in Direction Finding Part I: Investigation into the estimation algorithms", 1st Annual COST 273 Workshop, May/Jun. 2002; 8 pages.

Ivan Tashev; Microsoft Array project in MSR: approach and results, http://research.microsoft.com/users/ivantash/ Documents/MicArraysInMSR.pdf; Jun. 2004; 49 pages.

"Press Releases"; Retrieved from the Internet: http://www.acousticmagic.com/press/; Mar. 14, 2003-Jun. 12, 2006; 18 pages; Acoustic Magic.

Marc Gayer, Markus Lohwasser and Manfred Lutzky; "Implementing MPEG Advanced Audio Coding and Layer-3 encoders on 32-bit and 16-bit fixed-point processors"; Jun. 25, 2004; 7 pages; Revision 1.11; Fraunhofer Institute for Integrated Circuits IIS; Erlangen, Germany.

"Polycom Executive Collection"; Jun. 2003; 4 pages; Polycom, Inc.; Pleasanton, CA.

U.S. Appl. No. 11/406,071, entitled "Audio based on speaker position and/or conference location", by Michael L. Kenoyer, et al., filed Apr. 18, 2006.

* cited by examiner

AUDIO OUTPUT IN VIDEO CONFERENCING AND SPEAKERPHONE BASED ON CALL TYPE

PRIORITY

This application claims priority to U.S. Provisional Patent Application, Ser. No. 60/619,212, titled "Video Conferencing Speakerphone", which was filed Oct. 15, 2004, whose inventors are Michael L. Kenoyer, Craig B. Malloy, and Wayne E. Mock which is hereby incorporated by reference in its entirety as though fully and completely set forth herein.

This application further claims priority to U.S. Provisional Patent Application, Ser. No. 60/676,057, titled "Audio Output in Video Conferencing and Speakerphone Based on Call Type", which was filed Apr. 29, 2005, whose inventors are Michael L. Kenoyer and Wayne E. Mock which is hereby incorporated by reference in its entirety as though fully and completely set forth herein.

BACKGROUND OF THE INVENTION

1. Field of the Invention

The present invention relates generally to audio and, more specifically, to audio for video conference calls.

2. Description of the Related Art

People may communicate vocally through various devices including telephones, cellular phones, and Internet phones. People may also communicate with each other through video communication devices (e.g., through video conferencing systems). In a video conference, cameras and microphones located at local and remote sites may capture video and audio of conference participants to transmit to the other respective site. In addition, each video conference site may include a display and a speaker for reproducing the received video and audio signals.

Video conference calls allow multiple participants at different video conference sites to interact with each other face to face (i.e., through video). Because a conference system may be communicating with several other conference systems, each with multiple participants, it may become very difficult to discern who is speaking or from which conference site the current participant is speaking.

SUMMARY OF THE INVENTION

In various embodiments, a conference call may involve participants with video conferencing systems and audio participants with speakerphone systems. At least one conference site may have a video sound system and a speakerphone sound system. In some embodiments, sound from audio-only participants (e.g., speakerphone participants) may be sent through a speakerphone sound system at the conference site while sound from video participants may be sent through the video sound system at the conference site. In some embodiments, sound may be localized to only the video sound system or only the speakerphone sound system. In some embodiments, sound may be localized through a combination of both the video sound system and the speakerphone sound system to produce a spatially correct sound field (i.e., video participants heard through the video sound system and speakerphone participants heard through the speakerphone sound system) for in room participants. In some embodiments, the spatially correct sound field may provide a more natural sound experience for the participants in the room.

In some embodiments, sound from both video conferencing participants and audio only participants may be produced through the video sound system. In some embodiments, sound from both video conferencing participants and audio only participants may be produced through the speakerphone sound system.

In some embodiments, at a conferencing site with both a video conferencing system and a speakerphone, the audio for the video conference may be generated from the speakerphone microphone array.

BRIEF DESCRIPTION OF THE DRAWINGS

A better understanding of the present invention may be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. Provisional Patent Application titled "Speakerphone", Ser. No. 60/619,303, which was filed Oct. 15, 2004, whose inventors are William V. Oxford, Michael L. Kenoyer, and Simon Dudley is hereby incorporated by reference in its entirety as though fully and completely set forth herein.

U.S. Provisional Patent Application titled "Speakerphone", Ser. No. 60/634,315 which was filed Dec. 8, 2004, whose inventors are William V. Oxford, Michael L. Kenoyer and Simon Dudley which is hereby incorporated by reference in its entirety as though fully and completely set forth herein.

U.S. Provisional Patent Application titled "Video Conference Call System", Ser. No. 60/619,210, which was filed Oct. 15, 2004, whose inventors are Jonathan W. Tracey, Craig B. Malloy, Michael L. Kenoyer, Michael V. Jenkins, Ashish Goyal, and Michael J. Burkett, is hereby incorporated by reference in its entirety as though fully and completely set forth herein.

U.S. Provisional Patent Application titled "High Definition Camera and Mount", Ser. No. 60/619,227, which was filed Oct. 15, 2004, whose inventors are Michael L. Kenoyer, Patrick D. Vanderwilt, Paul D. Frey, Paul Leslie Howard, Jonathan I. Kaplan, and Branko Lukic, is hereby incorporated by reference in its entirety as though fully and completely set forth herein.

U.S. Provisional Patent Application titled "Audio Based on Speaker Position and/or Conference Location", Ser. No. 60/675,962, which was filed Apr. 29, 2005, whose inventor is Michael L. Kenoyer is hereby incorporated by reference in its entirety as though fully and completely set forth herein.

U.S. Patent Application titled "Video and Audio Conferencing System With Spatial Audio", Ser. No. 11/252,1888, which was filed Oct. 17, 2005, whose inventors are Michael L. Kenoyer, Wayne E. Mock, and Craig B. Malloy, is hereby incorporated by reference in its entirety as though fully and completely set forth herein.

Figure 1:
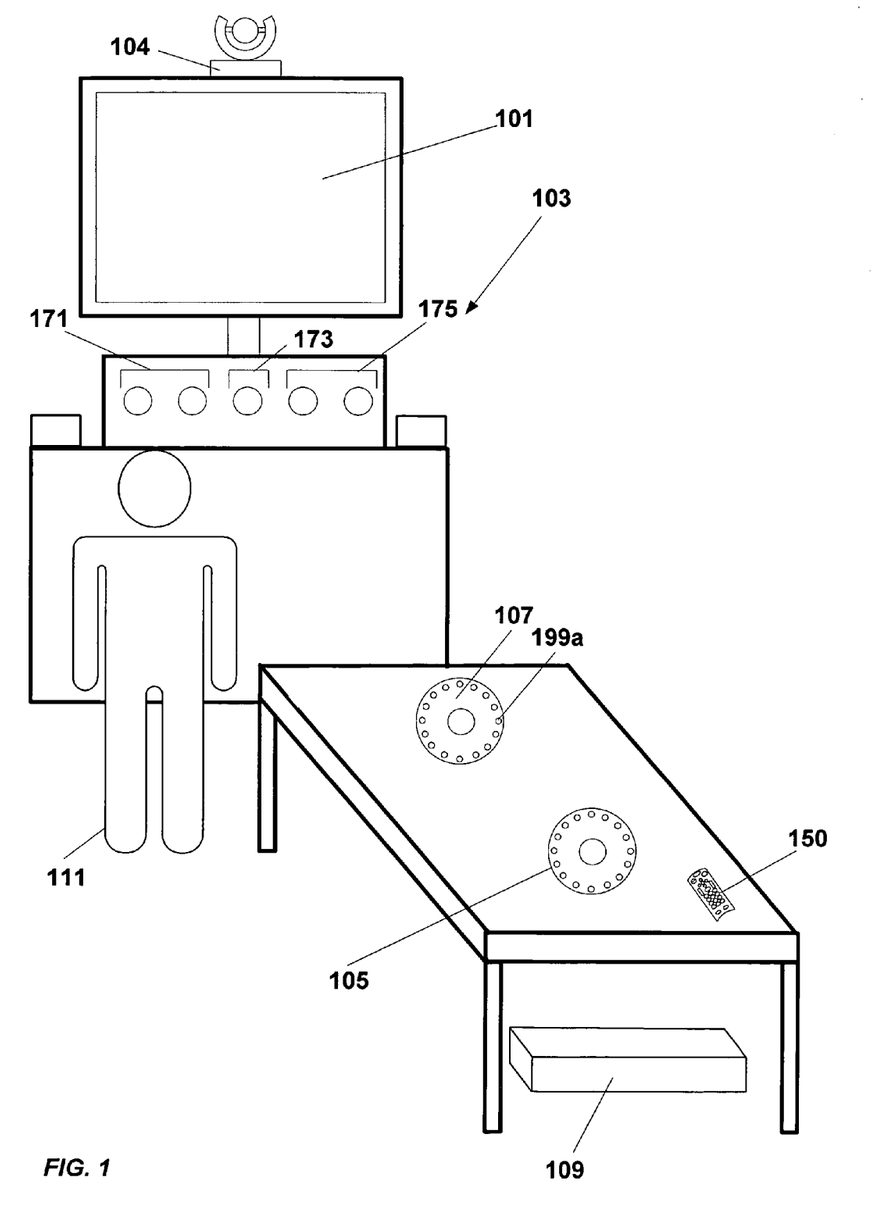
FIG. 1 illustrates a conference calling system with a video conference system and a speakerphone, according to an embodiment.
Figure 2:
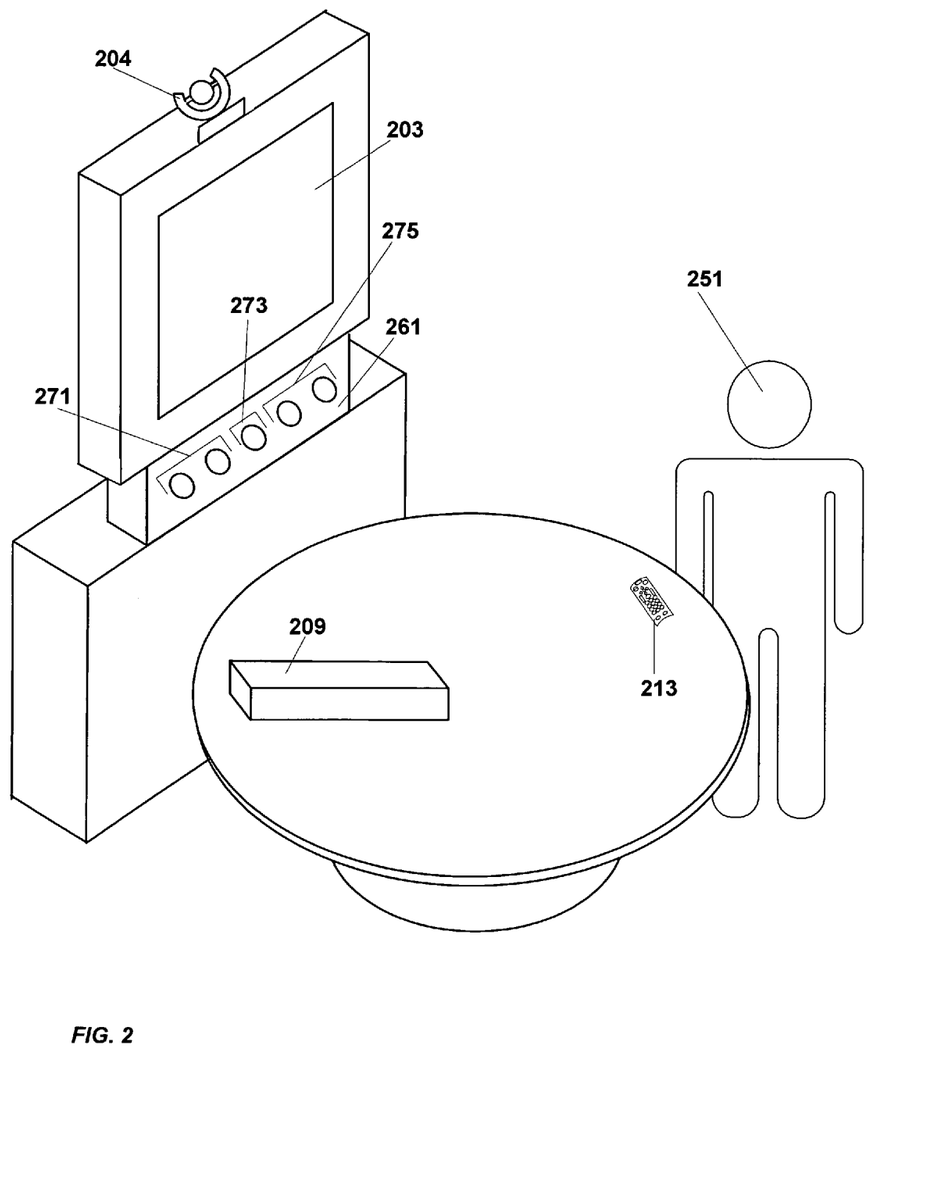
FIG. 2 illustrates a video only conference participant, according to an embodiment.

FIG. 1 illustrates a conference calling network, according to an embodiment. In some embodiments, a conference call may involve participants with video conferencing systems (e.g., participant 251 in FIG. 2) and participants with audio-only systems (e.g., speakerphone participant 351 in FIG. 3). In some embodiments, sound from speakerphone participants may be sent through a speakerphone sound system (e.g., speakerphone 105 and/or speakerphone 107) while sound from video conference participants may be sent through the video sound system 103 (e.g., near a video monitor 101).

Figure 3:
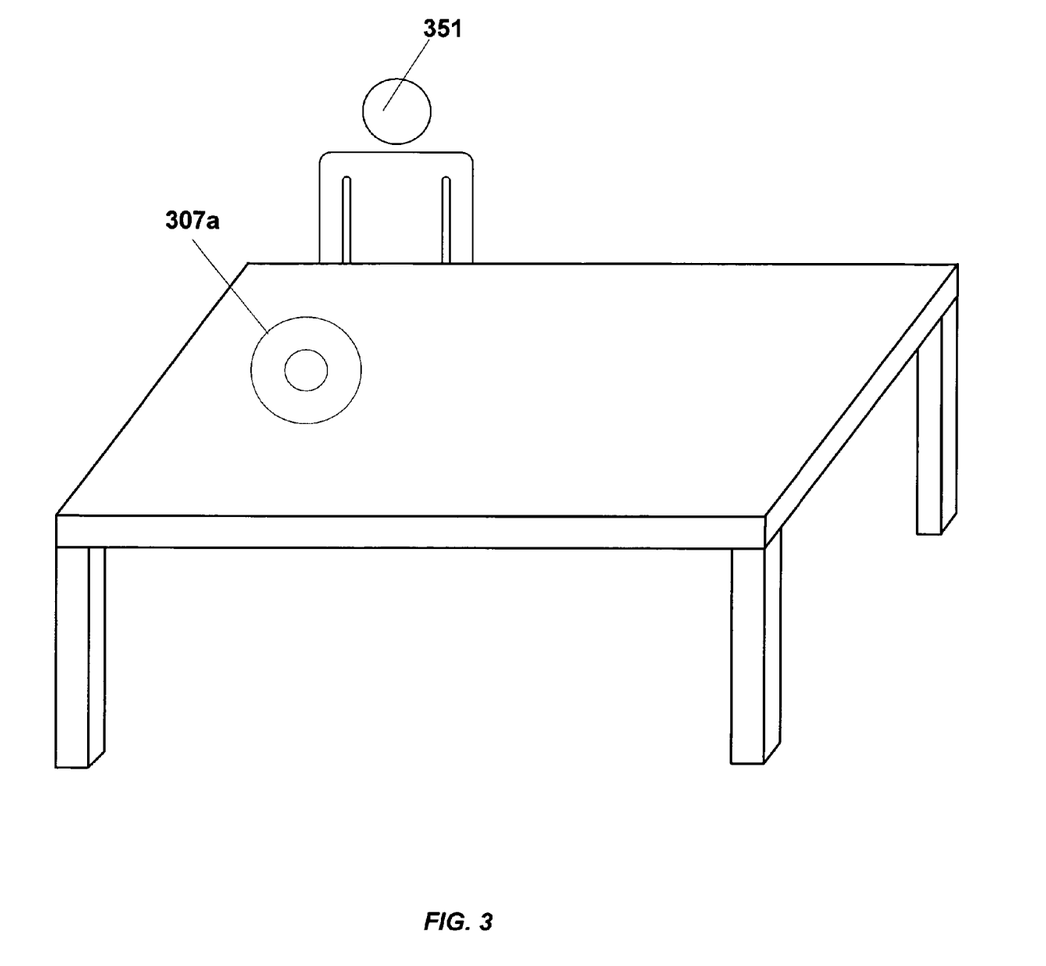
FIG. 3 illustrates a speakerphone only conference participant, according to an embodiment.

In some embodiments, sound from specific participants and/or specific conference location sources may be localized to only the video sound system 103 or only a speakerphone sound system 105/107 depending on whether the specific participant or specific conference location is using a video conference system (such as participant 251 in FIG. 2) or a speakerphone (such as participant 351 in FIG. 3). In some embodiments, sound may be localized through a combination of both the video sound system 103 and the speakerphone sound system 107. For example, if the current conference call involves participant 251 and participant 351, participant 251 may be heard through the video sound system 103 and participant 251 may be heard through one or both of the speakerphones 105/107. If other video participants are connected in the call, they may also be heard through the video sound system 103. If other speakerphone participants are connected in the call, they may also be heard through one or both speakerphones 105/107. In some embodiments, if both the video sound system 103 and the speakerphone sound system is used, a separate echo cancellor may be needed for each sound system (e.g., when capturing audio from the local participants an echo cancellor for the video sound system and an echo cancellor for the speakerphone sound system may be needed to produce an audio signal to send to the remote sites).

In some embodiments, at a conferencing site with both a video conferencing system and a speakerphone, the audio from the local video conference participants may be captured using the local speakerphone microphone array 199. In some embodiments, if capturing the audio from the local video conference through the speakerphone microphone array 199, microphone with improved frequency response (e.g., in an upper range of approximately 7 kHz to 22 kHz) may be used. Other frequency response are also contemplated. For example, 22 kHz microphones in the speakerphone may generate a good audio signal for the video conference participants to send to remote conference sites. Other microphones are also contemplated.

In some embodiments, another conference site may have both a video sound system and a speakerphone. In this embodiment, the conference site with both sound systems may be reproduced through the video sound system 103 and/or the speakerphone 105/107. Keeping the sound sources distinct may create a spatially correct sound field (e.g., video participants heard through the video sound system and speakerphone participants heard through a speakerphone sound system) for an in room participant 111. In some embodiments, the spatially correct sound field may provide a more natural sound experience for participant 111 in the room.

In various embodiments, the sound systems 103, 105, 107 may have a selectable audio input with an adjustable output attenuation (i.e., volume control), and some form of sound reproduction (e.g., speaker(s)). In some embodiments, the speakerphones 105/107 may be coupled to the conference system through a power over Ethernet (POE) cable. In some embodiments, the speakerphones 105/107 may be coupled to the conference system through another link. The speakerphone may have microphones (e.g., 16 radially spaced microphones) to provide high quality audio pickup using directional pickup beams from the microphones. Other numbers and configurations of microphones may also be used. In some embodiments, a speakerphone coupled to the conference system may provide audio pick-up (i.e., detection) for video and/or audio calls.

In some embodiments, sound from both video conferencing participants and audio only participants may be produced through the video sound system 103. In some embodiments, sound from both video conferencing participants and audio only participants may be produced through the speakerphone sound system (e.g., speakerphone 105 and/or 107).

In various embodiments, multiple sound systems may be used to create the spatially correct sound field. For example, video conferencing systems coupled to a speakerphone may have two distinct sound systems for reproducing the audio of a call, the one attached to and associated with the system's codec functionality (i.e., video sound system 103), and the speakerphone (e.g., speakerphones 105/107) (which may also be coupled to the system codec). Video calls may use both video and audio streams during the call, while audio calls may use only audio streams. In some embodiments, the video sound system 103 may emanate from or appear to emanate from the connected display 101 (e.g., television). In some embodiments, the speakerphone sound system may emanate from the speakerphone 105/107. The distinct locations of the two sound systems may help create a directional sound field allowing the participant 111 within the room to discern from which direction, hence which sound subsystem, the sound emanates. In some embodiments, circuitry in the system codec may arrange which received audio signals are put through which respective sound system. Other system devices for manipulating the audio signals are also contemplated. In some embodiments, the audio signals may be labeled (e.g., speakerphone or video participant) to assist the system device in placing the audio signals on appropriate sound systems. In some embodiments, the system device may determine placement of the audio signals based on the type of audio signal or source of the audio signal. Other criteria may also be used in determining how to place the audio signals.

In various embodiments, both the speakerphone 105/107 and the video system device (e.g., the codec) may provide separate means of sound attenuation. The speakerphone 105/107 may have a volume up/down button on the speakerphone 105/107, while the video system device 109 may use a remote control 150 with volume up/down buttons. The separate means of sound attenuation may allow a participant 111 to increase/decrease the volume of the video participants (i.e., through controlling the video sound system 103) separate from the volume of the audio only participants.

In some embodiments, during homogeneous type (audio or video only), single or multi-connection calls, pressing either set of volume control buttons may adjust the attenuation of the sound of the call. In some embodiments, the conference system may not correlate button sets with a type of call. For example, during an audio only call, pressing the volume up/down buttons on the remote control may adjust the attenuation of the speakerphone 105/107. Likewise, during a video call, pressing the volume up/down buttons on the speakerphone may adjust the attenuation of the video call.

Figure 4:
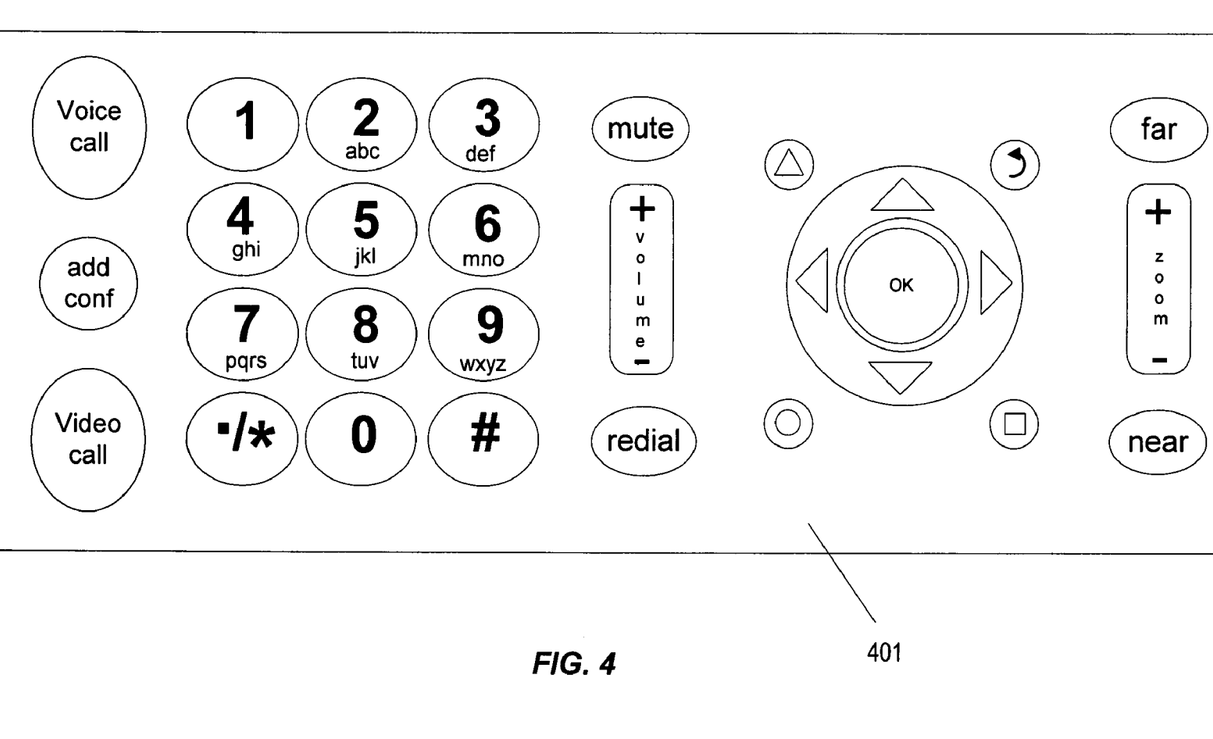
FIG. 4 illustrates a system codec, according to an embodiment.

FIG. 4 illustrates a system codec, according to an embodiment. Furthermore, an embodiment of a system codec keypad is shown. In some embodiments, buttons may be used on the codec keypad 401. External call data may be received by the codec 401. The codec may send audio from audio-only participants through the speakerphone and may send video and audio from video participants to the video conferencing system. In some embodiments, when a call is first received, the system codec may determine if the source is a voice only system or a video conference system. The system codec may send audio received from that source to the speakerphone or video conference center based on that initial determination. In some embodiments, the audio from the different sources may have designators to specify its source and/or whether the source is voice only or a video conference device.

Figure 5A:
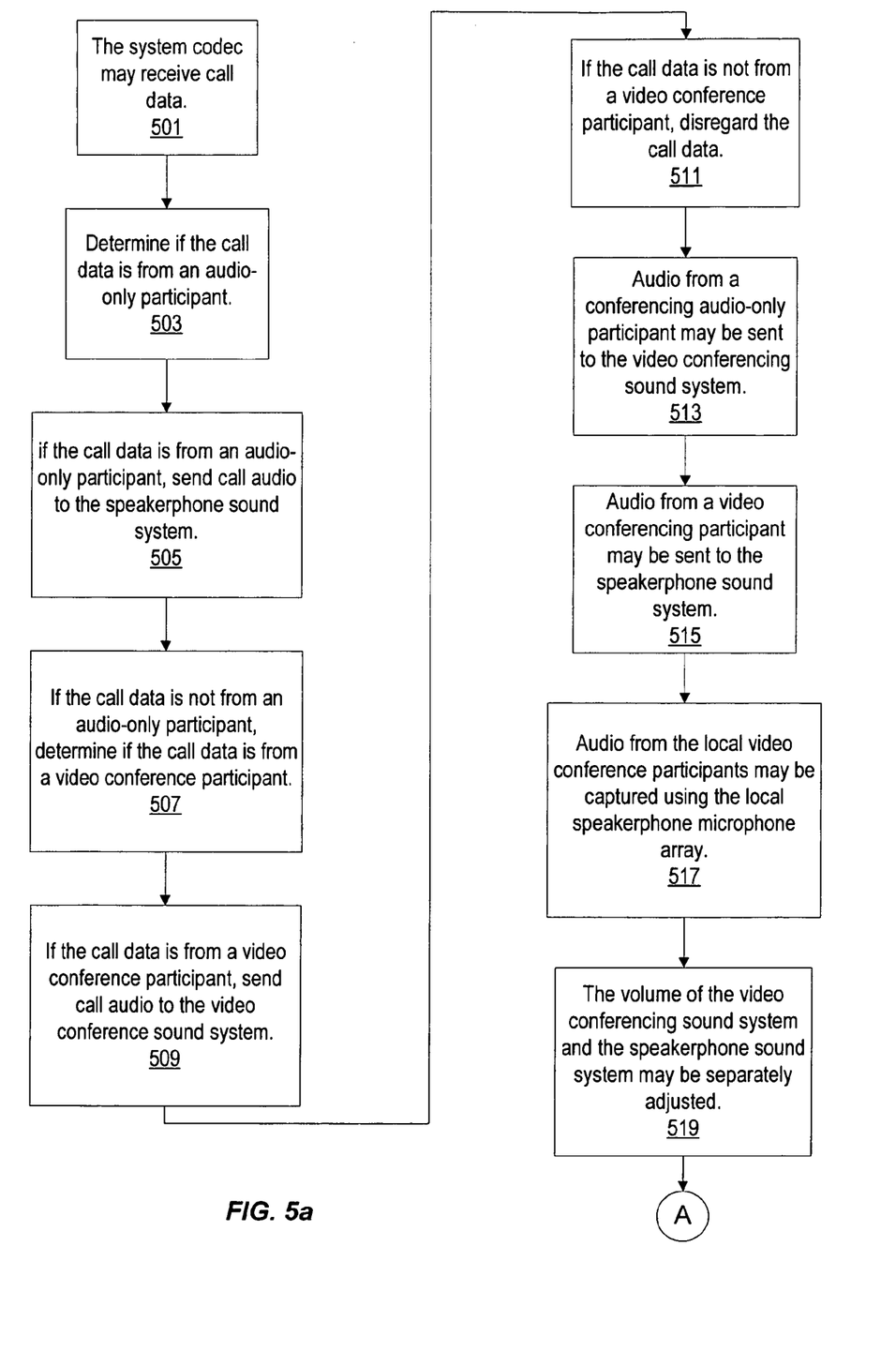
FIGS. 5a and 5b illustrate a method for reproducing the audio from the video conferencing participant and the speakerphone participant.
Figure 5B:
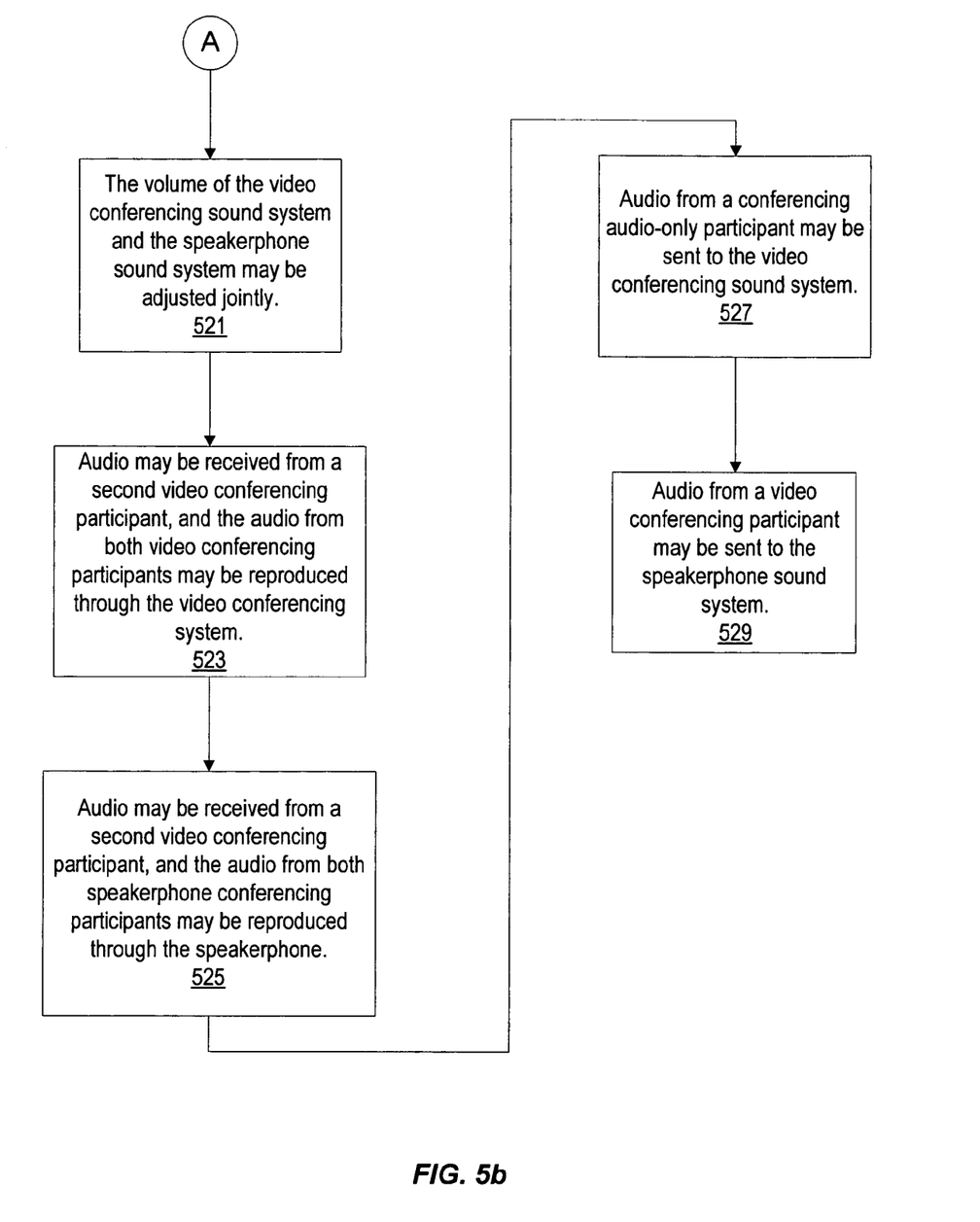

FIGS. 5*a* and *b* illustrate a method for reproducing the audio from the video conferencing participant and the speakerphone participant. It is noted that in various embodiments one or more of the method elements may be performed concurrently, in a different order, or be omitted. Additional elements may be performed as desired.

At 501, the video system device may receive call data. For example, the video system device may receive call data over an IP connection or over a public switched telephone network (PSTN). In some embodiments, the call data may include audio data.

At 503, determine if the call data is from an audio-only participant. In some embodiments, the call data may be accompanied with a caller identifier. The system may associate the caller identifier with either audio-only or video conference participant. In some embodiments, call data may be continuously accompanied with an identifier. In some embodiments, the system may determine the source based on the format of the call data. Other ways of determining the call type are also contemplated.

At 505, if the call data is from an audio-only participant, send call audio (audio data) to the speakerphone sound system.

At 507, if the call data is not from an audio-only participant, determine if the call data is from a video conference participant.

At 509, if the call data is from a video conference participant, send call audio to the video conferencing sound system.

At 511, if the call data is not from a video conference participant, disregard the call data.

At 513, audio from a conferencing audio-only participant may be sent to the video conferencing sound system.

At 515, audio from a video conferencing participant may be sent to the speakerphone sound system.

At 517, audio from the local video conference participants may be captured using the local speakerphone microphone array.

At 519, the volume of the video conferencing sound system and the speakerphone sound system may be separately adjusted.

At 521, the volume of the video conferencing sound system and the speakerphone sound system may be adjusted jointly.

At 523, audio may be received from a second video conferencing participant, and the audio from both video conferencing participants may be reproduced through the video conferencing system.

At 525, audio may be received from a second video conferencing participant, and the audio from both speakerphone conferencing participants may be reproduced through the speakerphone.

At 527, audio from a conferencing audio-only participant may be sent to the video conferencing sound system.

At 529, audio from a video conferencing participant may be sent to the speakerphone sound system.

Embodiments of these methods may be implemented by program instructions stored in a memory medium or carrier medium. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, the computer system may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system, comprising:
   a speakerphone with a speakerphone sound system;
   a video conferencing sound system;
   a device communicatively coupled to the speakerphone sound system and the video conferencing sound system wherein the device is configured to place audio from a conferencing audio-only participant to the speakerphone sound system and audio from a video participant to the video conferencing sound system.

2. The system of claim 1, wherein at least one remote conference participant is a speakerphone only participant.

3. The system of claim 1, wherein at least one remote conference participant is a video conferencing participant.

4. The system of claim 1, wherein the device is further configured to place audio from a conferencing audio-only participant to the video conferencing sound system.

5. The system of claim 1, wherein the device is further configured to place audio from a video conferencing participant to the speakerphone sound system.

6. The system of claim 1, wherein adjusting the volume of the video conferencing sound system adjusts the volume of the speakerphone.

7. The system of claim 1, wherein the audio from at least two speakerphone only participants is reproduced through the speakerphone sound system.

8. The system of claim 1, wherein the audio from at least two video sound system participants is reproduced through the video conferencing sound system.

9. The system of claim 1, wherein the audio from the video conferencing sound system and the audio from the speakerphone sound system may be adjusted separately.

10. A method, comprising:
    receiving call data comprising audio data;
    determining if the call data is from an audio-only participant;
    sending audio data to a speakerphone sound system if the call data is from the audio-only participant
    determining if the call data is from a video conference participant if the call data is not from an audio-only participant; and
    sending audio data to a video conference sound system if the call data is from a video conference participant.

11. The method of claim 10, further comprising:
    separately adjusting the volume of the video conferencing sound system and the speakerphone sound system.

12. The method of claim 10, further comprising:
    adjusting the volume of the video conferencing sound system and the speakerphone sound system jointly.

13. The method of claim 10, further comprising:
    receiving audio from a second video conferencing participant; and
    reproducing the audio from both video conferencing participants through the video conferencing system.

14. The method of claim 10, further comprising:
    receiving audio from a second speakerphone participant; and
    reproducing the audio from both speakerphone participants through the speakerphone.

15. The method of claim 10, wherein the audio from the video conferencing participant and the speakerphone participant are received by a device, and wherein the device directs the audio from the video conferencing participant to the video conferencing sound system and directs the audio from the speakerphone participant to the speakerphone.

16. The method of claim 10, further comprising sending audio from a conferencing audio-only participant to the video conferencing sound system.

17. The method of claim 10, further comprising sending audio from a video conferencing participant to the speakerphone sound system.

18. A system, comprising:
    a first receiving means configured to receive audio from a video conferencing participant;
    a second receiving means configured to receive audio from a speakerphone participant;
    a reproducing means configured to reproduce the audio from the video conferencing participant through a video conferencing sound system and reproduce the audio from the speakerphone conferencing participant through the speakerphone sound system.

19. The system of claim 18, further comprising:
    an adjustment means configured to adjust the volume of the video conferencing system and the speakerphone jointly.

20. The system of claim 18, further comprising:
    an adjustment means configured to separately adjust the volume of the video conferencing system and the speakerphone system.

* * * * *